US009340656B2

(12) United States Patent
Mulholland

(10) Patent No.: US 9,340,656 B2
(45) Date of Patent: May 17, 2016

(54) LIQUID CRYSTALLINE COMPOSITION HAVING A DARK BLACK COLOR

(71) Applicant: Ticona LLC, Florence, KY (US)

(72) Inventor: Bruce Mulholland, Hebon, KY (US)

(73) Assignee: Ticona LLC, Florence, KY (US)

( * ) Notice: Subject to any disclaimer, the term of this patent is extended or adjusted under 35 U.S.C. 154(b) by 149 days.

(21) Appl. No.: 14/096,086

(22) Filed: Dec. 4, 2013

(65) Prior Publication Data

US 2014/0171576 A1    Jun. 19, 2014

Related U.S. Application Data

(60) Provisional application No. 61/739,039, filed on Dec. 19, 2012.

(51) Int. Cl.
| | |
|---|---|
| *C09K 19/52* | (2006.01) |
| *C09K 19/38* | (2006.01) |
| *C08K 3/04* | (2006.01) |
| *C08L 67/02* | (2006.01) |
| *A47J 36/02* | (2006.01) |
| *C08K 3/40* | (2006.01) |
| *C08K 3/34* | (2006.01) |
| *C09K 19/54* | (2006.01) |

(52) U.S. Cl.
CPC ... *C08K 3/40* (2013.01); *C08K 3/04* (2013.01); *C08K 3/34* (2013.01); *C08L 67/02* (2013.01); *C09K 19/3809* (2013.01); *C09K 19/52* (2013.01); *C09K 19/54* (2013.01); *A47J 36/02* (2013.01); *C09K 2019/521* (2013.01)

(58) Field of Classification Search
CPC .... C09K 19/3809; C09K 19/52; C09K 19/54; C09K 2019/521; C08K 3/03; C08K 3/34; C08K 3/40; C08L 67/02; A47J 36/02
See application file for complete search history.

(56) References Cited

U.S. PATENT DOCUMENTS

| | | | |
|---|---|---|---|
| 4,065,655 A | 12/1977 | Wong et al. | |
| 4,161,470 A | 7/1979 | Calundann | |
| 4,626,557 A | 12/1986 | Duska et al. | |
| 5,492,946 A | 2/1996 | Huspeni et al. | |
| 5,616,680 A | 4/1997 | Linstid, III | |
| 5,830,940 A * | 11/1998 | Nakamura et al. | 524/404 |
| 6,114,492 A | 9/2000 | Linstid, III et al. | |

(Continued)

FOREIGN PATENT DOCUMENTS

| | | |
|---|---|---|
| EP | 1 810 757 A1 | 7/2007 |
| EP | 2 074 886 A2 | 7/2009 |

(Continued)

OTHER PUBLICATIONS

Abstract of Japanese Publication—JPH06248165, Sep. 6, 1004, 1 page.

(Continued)

*Primary Examiner* — Shean C Wu
(74) *Attorney, Agent, or Firm* — Dority & Manning, P.A.

(57) ABSTRACT

A shaped part that is formed from a polymer composition that contains a liquid crystalline polymer and a black pigment is provided. By selectively controlling the type and relative concentration of these components, the polymer composition and shaped parts formed therefrom can have a dark black appearance, and yet still exhibit good thermal and mechanical properties at high temperatures.

19 Claims, 3 Drawing Sheets

(56) References Cited

U.S. PATENT DOCUMENTS

| | | |
|---|---|---|
| 6,121,369 A | 9/2000 | Stack et al. |
| 6,407,149 B1 | 6/2002 | McCullough |
| 6,514,611 B1 | 2/2003 | Shepherd et al. |
| 6,755,991 B2 | 6/2004 | Kometani et al. |
| 6,758,989 B2 | 7/2004 | Miyashita et al. |
| 7,449,239 B2 | 11/2008 | Seeger et al. |
| 7,578,950 B2 | 8/2009 | Kirchner et al. |
| 7,709,568 B2 | 5/2010 | Bersted et al. |
| 7,985,351 B2 | 7/2011 | Yamauchi et al. |
| 7,989,531 B2 | 8/2011 | Bersted et al. |
| 8,142,683 B2 | 3/2012 | Murouchi et al. |
| 8,192,645 B2 | 6/2012 | Murouchi et al. |
| 8,658,057 B2 | 2/2014 | Nakayama et al. |
| 8,834,741 B2 | 9/2014 | Shiraishi et al. |
| 2002/0045728 A1* | 4/2002 | Kometani et al. ............ 528/271 |
| 2004/0235998 A1 | 11/2004 | Kirchner |
| 2007/0057236 A1 | 3/2007 | Hosoda et al. |
| 2011/0189454 A1 | 8/2011 | Fukuhara et al. |
| 2014/0011011 A1 | 1/2014 | Fujino et al. |
| 2014/0264183 A1* | 9/2014 | Kim ............................ 252/500 |

FOREIGN PATENT DOCUMENTS

| | | | |
|---|---|---|---|
| GB | 2 328 436 A | | 2/1999 |
| GB | 2 455 872 A | | 6/2009 |
| JP | 2009242455 A | * | 10/2009 |
| WO | WO 2004005425 A2 | | 1/2004 |
| WO | WO 2004022669 A1 | | 3/2004 |
| WO | WO 2004058851 A1 | | 7/2004 |
| WO | WO 2014055252 A1 | | 4/2014 |

OTHER PUBLICATIONS

Abstract of Japanese Publication—JPH07196894, Aug. 1, 2005, 1 page.
Abstract of Japanese Publication—JP2001279066, Oct. 10, 2001, 1 page.
Abstract of Japanese Publication—JP2008247985, Oct. 16, 2008, 1 page.
Abstract of International Publication No. WO2013066003, May 10, 2013, 1 page.
Material Safety Data Sheet on Black Pearls® 120 from Cabot Corporation, Jul. 11, 2011, 15 pages.
Product Information from Cabot Corporation on Black Pearls® 4350 and Black Pearls 4750: High Purity Furnace Blacke for FDA Applications, 2004, 4 pages.
Product Information from Cabot Corporation on Black Pearls® 4750, Sep. 2004, 2 pages.
Product Information from Cabot Corporation—Color Measurement for Carbon Black Filled Plastics, 6 pages.
Zenite® Product Offering from Celanese Corporation, 1 page.
International Search Report and Written Opinion for PCT/US2013/073032 dated Mar. 12, 2014, 11 pages.
U.S. Appl. No. 14/527,806, filed Oct. 30, 2014, Tyler et al., Liquid Crystalline Composition having a Pearly Luster.

* cited by examiner

LIQUID CRYSTALLINE COMPOSITION HAVING A DARK BLACK COLOR

RELATED APPLICATIONS

The present application claims priority to U.S. Provisional Application Ser. No. 61/739,039 (filed on Dec. 19, 2012), which is incorporated herein in its entirety by reference thereto.

BACKGROUND OF THE INVENTION

Foodstuff articles (e.g., cookware and bakeware) have traditionally been made from metals, such as aluminum, copper, cast iron, or stainless steel. Although strong and very conductive, metal foodstuff articles tend to be relatively heavy, corrosive, and can produce loud and noisy sounds when handled. In light of the above, various attempts have been made to use high performance polymers, such as thermotropic liquid crystalline polymers, to manufacture some types of foodstuff articles due to their excellent chemical resistance and thermal properties. One of the difficulties with these polymers, however, is that their color is not readily altered by conventional means. This is particularly problematic for foodstuff articles in which a sleek and black appearance is often desired. As such, a need currently exists for a liquid crystalline polymer composition that has a black appearance for use in a wide variety of articles (e.g., foodstuff articles).

SUMMARY OF THE INVENTION

In accordance with one embodiment of the present invention, a shaped part is disclosed that comprises a liquid crystalline polymer composition. The composition comprises a liquid crystalline polymer and a black pigment that includes a plurality of carbon black particles in an amount of from about 1 wt. % to about 10 wt. % of the polymer composition. The composition defines a black surface of the part that is characterized according to the CIELAB test by a $L^*$ value of about 30 or less, wherein $L^*$=is a luminosity value ranging from 0 to 100, where 0=black and 100=white.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
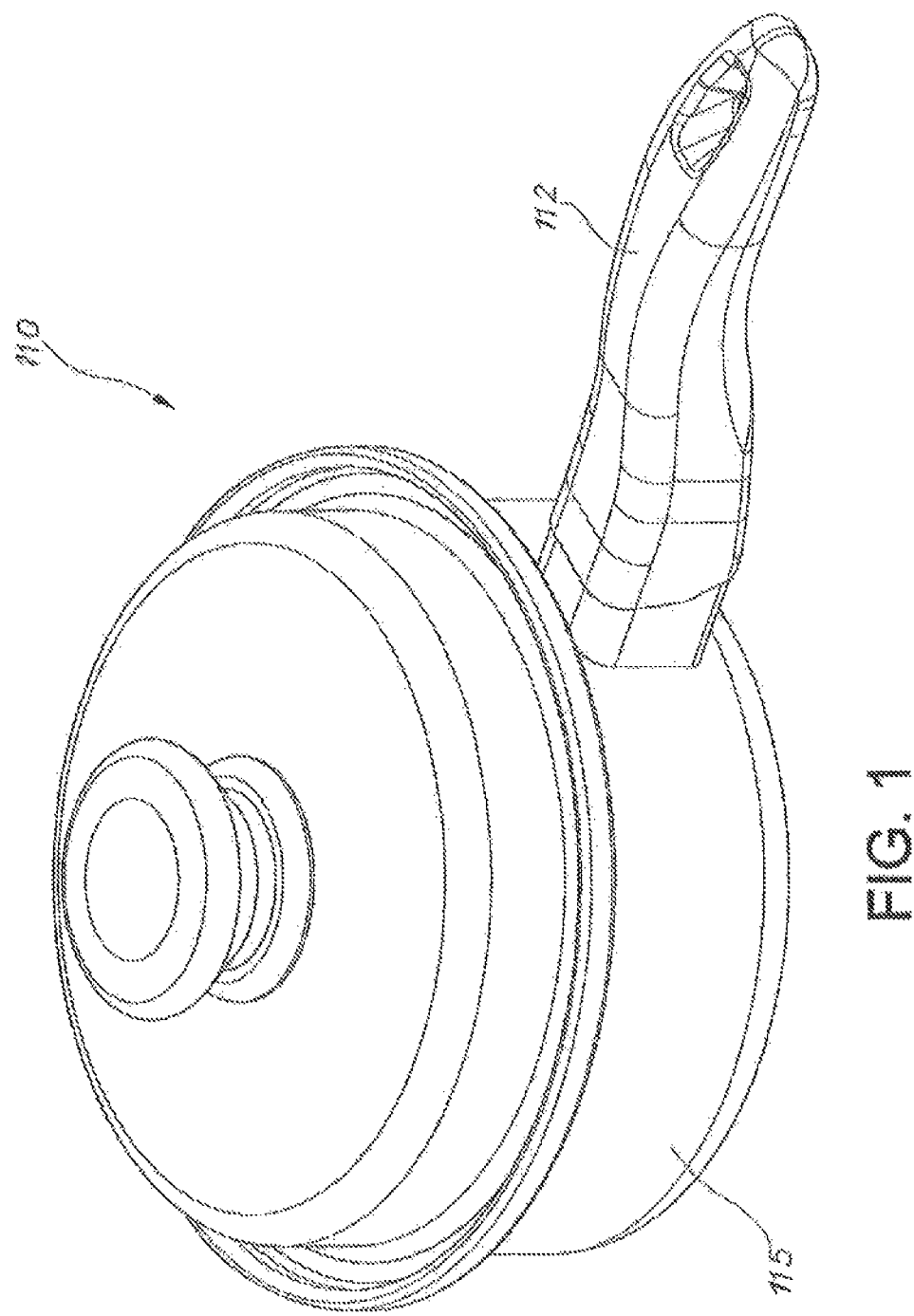
FIG. 1 is a perspective view of one embodiment of a foodstuff article in the form of a saucepan, all or a portion of which may be formed from the polymer composition of the present invention.

It is to be understood by one of ordinary skill in the art that the present discussion is a description of exemplary embodiments only, and is not intended as limiting the broader aspects of the present invention.

Generally speaking, the present invention is directed to a shaped part that is formed from a polymer composition that contains a liquid crystalline polymer and black pigment. By selectively controlling the type and relative concentration of these components, the polymer composition and shaped parts formed therefrom can have a dark black appearance, and yet still exhibit good thermal and mechanical properties at high temperatures. The black appearance can be quantified by measuring the absorbance with a spectrophotometer. Color measurement is performed using a DataColor 600 Spectrophotometer utilizing an integrating sphere with measurements made using the specular excluded mode. Similar results would be obtained using 45/0 or 0/45 geometry instruments as they also exclude the gloss component from the color measurement. Color coordinates are calculated according to ASTM D2244-11 under illuminant D65, 10° observer, using CIELAB units. This method defines three color coordinates $L^*$, $a^*$, and $b^*$, which correspond to three characteristics of a perceived color based on the opponent theory of color perception and are defined as follows:

$L^*$=Luminosity value ranging from 0 to 100, where 0=black and 100=white;

$a^*$=Red/green axis, ranging from −150 to 100; positive values are reddish and negative values are greenish; and $b^*$=Yellow/blue axis, ranging from −100 to 100; positive values are yellowish and negative values are bluish.

The $L^*$ value can, for instance, be used to measure the strength of the black color and the $b^*$ value can be used to measure the blue undertone. In the present invention, for instance, the $L^*$ value of the composition is typically about 30 or less, in some embodiments about 29 or less, and in some embodiments, from 0 to about 28. The $b^*$ value of the composition may also be about 4 or less, in some embodiments about 3 or less, and in some embodiments, from about −3 to about 2.

The shaped part may also possess a relatively high degree of heat resistance. For example, the shaped part may possess a "blister free temperature" of about 270° C. or greater, in some embodiments from about 280° C. to about 350° C., and in some embodiments, from about 290° C. to about 320° C. As explained in more detail below, the "blister free temperature" is the maximum temperature at which a shaped part does not exhibit blistering when placed in a heated silicone oil bath. Such blisters generally form when the vapor pressure of trapped moisture exceeds the strength of the part, thereby leading to surface defects. The present inventor has also discovered that the deflection temperature under load ("DTUL"), a measure of short term heat resistance, may remain relatively high. For example, the DTUL value may range from about 250° C. to about 350° C., in some embodiments from about 260° C. to about 300° C., and in some embodiments, from about 265° C. to about 290° C.

Various embodiments of the present invention will now be described in further detail.

I. Polymer Composition

A. Liquid Crystalline Polymer

Liquid crystalline polymers are generally classified as "thermotropic" to the extent that they can possess a rod-like structure and exhibit a crystalline behavior in its molten state (e.g., thermotropic nematic state). Such polymers may be formed from one or more types of repeating units as is known in the art. The liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

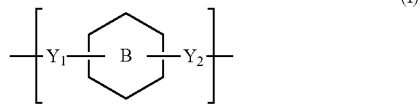

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

To help achieve the desired degree of heat resistance, the liquid crystalline polymer may be a "naphthenic-rich" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically more than 15 mol. %, in some embodiments more than about 18 mol. %, in some embodiments from about 20 mol. % to about 70 mol. %, and in some embodiments, from 25 mol. % to about 60 mol. % of the polymer. In one particular embodiment, for example, a "naphthenic-rich" aromatic polyester may be formed that contains monomer repeat units derived from a naphthenic acid (e.g., NDA and/or HNA); 4-hydroxybenzoic acid ("HBA"), terephthalic acid ("TA") and/or isophthalic acid ("IA"); as well as various other optional constituents. The monomer units derived from 4-hydroxybenzoic acid ("HBA") may constitute from about 40 mol. % to about 95 mol. %, in some embodiments from about 45 mol. % to about 90 mol. %, and in some embodiments, from about 50 mol. % to about 80 mol. % of the polymer, while the monomer units derived from terephthalic acid ("TA") and/or isophthalic acid ("IA") may each constitute from about 1 mol. % to about 30 mol. %, in some embodiments from about 2 mol. % to about 25 mol. %, and in some embodiments from about 3 mol. % to about 20 mol. % of the polymer. Other possible monomer repeat units include aromatic diols, such as 4,4'-biphenol ("BP"), hydroquinone ("HQ"), etc. and aromatic amides, such as acetaminophen ("APAP"). In certain embodiments, for example, BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed.

Regardless of the particular constituents and nature of the polymer, the liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III. et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 225° C. to about 400° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 225° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 350° C. The polymerization time will of course vary based on the temperature and target molecular weight. In most cases, however, the solid-state polymerization time will be from about 2 to about 12 hours, and in some embodiments, from about 4 to about 10 hours.

The resulting liquid crystalline polymer may have a relatively high melting temperature. For example, the melting temperature of the polymer may be from about 225° C. to about 400° C., in some embodiments from about 250° C. to about 395° C., and in some embodiments, from about 280° C. to about 380° C. While having a relatively high melting temperature, the polymer can maintain a relatively low melt viscosity. The melt viscosity of the liquid crystalline polymer may, for instance, be about 250 Pa-s or less, in some embodiments about 150 Pa-s or less, and in some embodiments, from about 20 to about 125 Pa-s, determined at a shear rate of 1000 seconds$^{-1}$. Melt viscosity may be determined in accordance with ASTM Test No. 1238-70 at temperatures ranging from 320° C. to 370° C. depending on the melting temperature (e.g., 350° C. or 370° C.). The resulting liquid crystalline polymer may also have a high number average molecular weight ($M_n$) of about 2,000 grams per mole or more, in some embodiments from about 4,000 grams per mole or more, and in some embodiments, from about 5,000 to about 50,000 grams per mole. The intrinsic viscosity of the polymer, which is generally proportional to molecular weight, may also be relatively high. For example, the intrinsic viscosity may be about about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol, as described in more detail below.

B. Black Pigment

The black pigment of the polymer composition generally includes a plurality of carbon black particles, such as furnace black, channel black, acetylene black, lamp black, etc. The carbon black particles may have any desired shape, such as a granular, flake (scaly), etc. The average size (e.g., diameter) of the particles may, for instance, range from about 1 to about 200 nanometers, in some embodiments from about 5 to about 150 nanometers, and in some embodiments, from about 10 to about 100 nanometers. It is also typically desired that the carbon black particles are relatively pure, such as containing polynuclear aromatic hydrocarbons (e.g., benzo[a]pyrene, naphthalene, etc.) in an amount of about 1 part per million ("ppm") or less, and in some embodiments, about 0.5 ppm or less. For example, the black pigment may contain benzo[a]pyrene in an amount of about 10 parts per billion ("ppb") or less, and in some embodiments, about 5 ppb or less.

If desired, the black pigment of the polymer composition may include a carrier resin that can encapsulate the carbon black particles, thereby providing a variety of benefits. For example, the carrier resin can enhance the ability of the particles to be handled and incorporated into the base polymer composition. While any known carrier resin may be employed for this purpose, in particular embodiments, the carrier resin is a liquid crystalline polymer, which may be the same or different than the base liquid crystalline polymer employed in the polymer composition. If desired, the carrier resin may be pre-blended with the carbon black particles to form a pigment masterbatch, which can later be combined with the liquid crystalline polymer. When employed, the carrier resin typically constitutes from about 50 wt. % to about 95 wt. %, in some embodiments from about 60 wt. % to about 90 wt. %, and in some embodiments, from about 70 wt. % to about 85 wt. % of the masterbatch, and the carbon black particles typically constitute from about 5 wt. % to about 50 wt. %, in some embodiments from about 10 wt. % to about 40 wt. %, and in some embodiments, from about 15 wt. % to about 30 wt. % of the masterbatch. Of course, other components may also be incorporated into the masterbatch.

The relative concentration of the carbon black particles and the liquid crystalline polymer may be selectively controlled in the present invention to achieve the desired black appearance without adversely impacting the thermal and mechanical properties of the polymer composition. In this regard, the carbon black particles are typically employed in an amount of from about 1 to about 10 wt. %, in some embodiments from about 1.5 wt. % to about 6 wt. %, and in some embodiments, from about 2 wt. % to about 4 wt. % of the entire polymer composition. The black pigment, which may optionally contain a carrier resin, may likewise constitute from about 1 to about 20 wt. %, in some embodiments from about 3 wt. % to about 18 wt. %, and in some embodiments, from about 4 wt. % to about 15 wt. % of the polymer composition. Liquid crystalline polymers, on the other hand, typically constitute from about 25 wt. % to about 75 wt. %, in some embodiments from about 30 wt. % to about 70 wt. %, and in some embodiments, from about 40 wt. % to about 60 wt. % of the polymer composition.

C. Other Additives

Besides the components noted above, the polymer composition may also employ one or more other additives. Examples of such additives include, for instance, UV stabilizers, light stabilizers, antioxidants, surfactants, flow promoters, fillers, lubricants, antimicrobials, and other materials added to enhance properties and processibility.

Inorganic particulate fillers, for instance, may also be employed in the polymer composition to help achieve the desired thermal and mechanical properties. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al, Mg, Fe)_2(Si,Al)_4O_{10}[(OH)_2, (H_2O)]$), montmorillonite ($(Na, Ca)_{0.33}(Al, Mg)_2Si_4O_{10}(OH)_2 \cdot nH_2O$), vermiculite (($(MgFe, Al)_3(Al, Si)_4O_{10}(OH)_2 \cdot 4H_2O$), palygorskite (($(Mg, Al)_2Si_4O_{10}(OH) \cdot 4(H_2O)$)), pyrophyllite ($Al_2Si_4O_{10}(OH)_2$), etc., as well as combinations thereof. In lieu of, or in addition to, clay minerals, still other particulate inorganic particulate fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K, Na)(Al, Mg, Fe)_2(Si, Al)_4O_{10}(OH)_2$), etc., as well as combinations thereof. The particulate filler may have an average particle size of from about 5 to about 50 micrometers, and in some embodiments, from about 10 to 20 micrometers. If desired, the particulate filler may also be in the shape of a plate-like particle in that the ratio of its major axis to thickness is 2 or more. When employed, such particulate fillers typically constitute from about 5 wt. % to about 60 wt. %, in some embodiments from about 10 wt. % to about 50 wt. %, and in some embodiments, from about 20 wt. % to about 40 wt. % of the composition.

Fibrous fillers may also be employed to help improve strength. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. Examples of such fibrous fillers may include those formed from glass, carbon, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. The number average fiber diameter of the fibers is typically from about 0.1 to 20 micrometers, and in some embodiments, from about 0.5 to 15 micrometers, while the number average fiber length is typically from about 1 to about 300 micrometers, and in some embodiments, from about 5 to about 250 micrometers. When employed, fibrous fillers typically constitute from about wt. % to about 40 wt. %, in some embodiments from about 5 wt. % to about 30 wt. %, and in some embodiments, from about 10 wt. % to about 20 wt. % of the composition.

II. Blending

The liquid crystalline polymer, black pigment (e.g., carbon black particles and/or carrier resin), and other optional additives (e.g., mineral filler and/or glass fiber filler) may be blended together in a variety of ways to achieve the desired polymer composition. In certain embodiments, for example, the black pigment may initially be formed as a masterbatch from the carbon black particles and carrier resin, such as described above, and thereafter combined with the liquid crystalline polymer. In such embodiments, optional additives may be incorporated into the black pigment masterbatch or simply blended together with the masterbatch and liquid crystalline polymer. Alternatively, the individual components of the composition may also be blended together without first forming a masterbatch from the carbon black particles and carrier resin.

Regardless of how they are supplied, the components of the polymer composition are generally blended together to form the polymer composition. Blending may occur at a temperature at or near the melting temperature of the liquid crystalline polymer, such as at a temperature of from about 225° C. to about 400° C., in some embodiments, from about 250° C. to about 395° C., and in some embodiments, from about 280° C. to about 380° C. Any of a variety of melt blending techniques may generally be employed in the present invention. For example, the components may be melt blended within an extruder that includes at least one screw rotatably mounted and received within a barrel (e.g., cylindrical barrel). The extruder may be a single screw or twin screw extruder. If desired, one or more distributive and/or dispersive mixing elements may be employed within the mixing and/or melting sections of the extruder. Suitable distributive mixers for single screw extruders may include, for instance, Saxon, DuImage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

III. Applications

Once formed, the resulting polymer composition may be shaped into any of a variety of different parts using techniques as is known in the art, such as injection molding, compression molding, blow molding, thermoforming, etc. For example, the parts may be molded using a one-component injection molding process in which dried and preheated plastic granules are injected into the mold. Various different types of articles may be made from shaped parts and/or polymer compositions of the present invention. Although any suitable shaped part can be formed, the polymer composition of the present invention is particularly useful in "foodstuff articles", which generally refers to any article for use in the preparation of a "foodstuff", i.e., a substance (e.g., solid or liquid) that can be used or prepared as nourishment, including food and beverages. Foodstuff articles may serve a variety of purposes, such as cooking, baking, heating, storing, etc., and may include, for instance, ovens or components thereof (e.g., doors, racks, etc.), microwaves, beverage containers, food containers, cookware, bakeware, etc. In addition to possessing an aesthetically pleasing appearance, the black color can also provide a signal to a user that the foodstuff article can be safely heated in an oven or stove.

Figure 2:
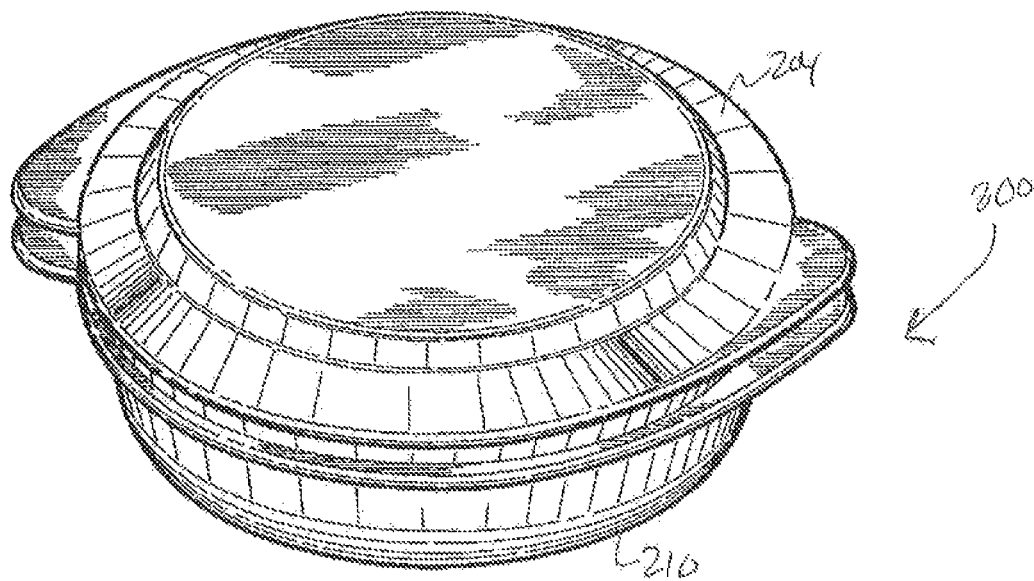
FIG. 2 is a perspective view of one embodiment of a foodstuff article in the form of a cooking container, all or a portion of which may be formed from the polymer composition of the present invention.

Foodstuff articles used for food preparation, such as cookware and bakeware, are particularly well adapted for use with a shaped part formed from the polymer composition of the present invention. The polymer composition of the present invention may, for instance, be used to produce all or a portion of cookware (e.g., cooking utensils, beverage containers, braising pans, roasting pans, casserole pans, dutch ovens, frying pans, skillets, wonder pots, griddles, saucepans, saute pans, stockpots, woks, etc.) and/or bakeware (e.g., cake pan, sheet pan, cookie sheet, jelly-roll pan, muffin pan, pie pan, bun pan, bread pan, etc.). When formed from the polymer composition of the present invention, such articles can be capable of withstanding high temperatures and also be chemical resistant and exceptionally inert. In certain embodiments, for example, the polymer composition of the present invention may be used to form a handle, cover, or lid of cookware or bakeware. Alternatively, the polymer composition may be used to form a cooking surface of the cookware or bakeware. Referring to FIG. 1, for instance, one embodiment of cookware 110 is shown that contains a handle 112 connected to a cooking vessel 115. If desired, the polymer composition of the present invention may be used to form all or a portion of the handle 112 and/or vessel 115. In the embodiment illustrated in FIG. 1, the cookware is in the form of a saucepan: however, it should be understood that a wide variety of other cookware articles may also be employed. Referring to FIG. 2, for instance, a cooking container 200 is shown that contains a lid 204 that is configured to be disposed over a base 210. Once again, as noted above, the polymer composition of the present invention may be used to form all or a portion of the lid 204 and/or the base 210.

Figure 3:
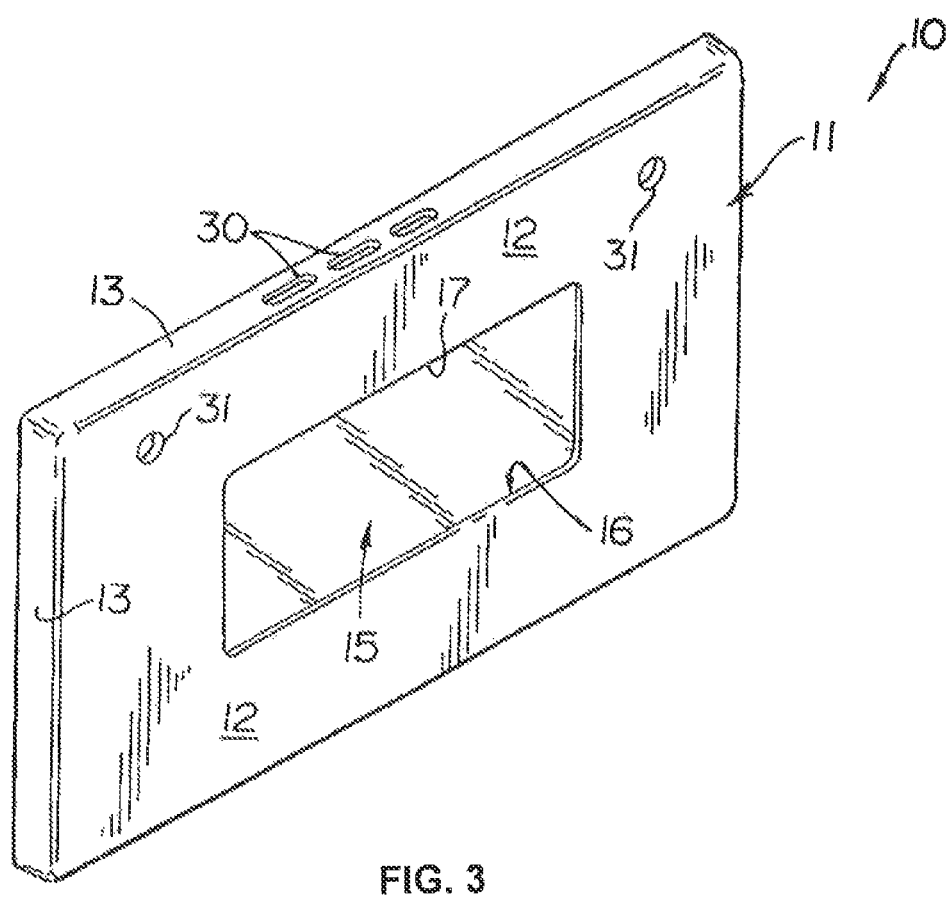
FIG. 3 is a front perspective view of one embodiment of a foodstuff article in the form of an oven door component, all or a portion of which may be formed from the polymer composition of the present invention.

Referring to FIG. 3, yet another embodiment of a foodstuff article that can employ the polymer composition of the present invention is shown. In this particular embodiment, the article is in the form of an oven door component 10. The door component 10 can be used alone as a door or as a shell that is united with a conventional metal oven inner door frame assembly. The oven door component 10 may be formed by hot compression molding of the polymer composition that forms a generally polygonal annular frame member 11 defined by a front annular wall 12 and a peripheral wall or flange 13. The front wall 12 is disposed substantially transverse or normal to the peripheral wall or flange 13 and borders the same about its entire periphery. A section of generally polygonal, square or rectangular tempered glass or a glass panel 15 may close an opening 16 defined by an innermost polygonal edge portion 17 of the front wall 12. A peripheral edge of the tempered glass panel 15 is encapsulated by the innermost peripheral edge portion 17 of the front wall 12 and is defined by an outermost border portion, flange or edge, an innermost border portion, flange or edge, and a peripheral juncture portion therebetween. If desired, one or more relatively elongated vent slots 30 can also be formed in upper and lower portions of the peripheral flange 13. Additionally, holes 31 can be formed in the front wall 12 during the molding of the annular frame member 11 or formed therein for the receipt of fasteners for securing a handle (not shown) to the door component 10.

The present invention may be better understood with reference to the following example.

Test Methods

Deflection Temperature Under Load ("DTUL"):

The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Blister Free Temperature:

To test blister resistance, a 127×12.7×0.8 mm test bar is molded at 5° C. to 10° C. higher than the melting temperature of the polymer resin, as determined by DSC. Ten (10) bars are immersed in a silicone oil at a given temperature for 3 minutes, subsequently removed, cooled to ambient conditions, and then inspected for blisters (i.e., surface deformations) that may have formed. The test temperature of the silicone oil begins at 250° C. and is increased at 10° C. increments until a blister is observed on one or more of the test bars. The "blister free temperature" for a tested material is defined as the highest temperature at which all ten (10) bars tested exhibit no blisters. A higher blister free temperature suggests a higher degree of heat resistance.

Example

Black polymer compositions (Samples 1 and 2) are formed from a liquid crystalline polymer (Vectra® E950iRX or S950SX), talc, fiberglass, and black pigment. In Samples 1-2, the black pigment is in the form of a masterbatch that contains 80 wt. % Vectra® E950iSX and 20 wt. % Black Pearls® 4750 (Cabot Corporation). Comparative samples are also formed that contain Pureblack 205 as the black pigment. Each of the samples is formed by initially drying the liquid crystalline polymer at 130° C. for a minimum of four (4) hours. The dried resin and black pigment are pre-blended in a high intensity mixer. The pre-blend is then fed into a 30-mm co-rotating twin screw extruder and pelletized. As a second step, the pelletized black concentrate is tumble blended with additional dried polymer and extruded with other ingredients to compound the final desired product. The product is then dried and molded into test articles such as color plaques (60 mm×80 mm×3 mm) and discs (100 mm×3 mm). The color of the resulting parts is measured using a spectrophotometer and data reported.

|  | Comparative Sample 1 | Comparative Sample 2 | Sample 1 | Sample 2 |
| --- | --- | --- | --- | --- |
| Vectra® S950SX | 53.0 |  |  | 51.5 |
| Vectra® E950iRX |  | 53.5 | 53.5 |  |
| Talc | 31.0 | 29.0 | 29.0 | 31.0 |
| Fiberglass | 15.0 | 15.0 | 15.0 | 15.0 |
| Pureblack 205 | 1.0 | 2.5 |  |  |
| Black Pearls 4750 |  |  | 2.5 | 2.5 |
| L* value | 36.0 | 31.4 | 27.9 | 27.3 |
| b* value | −2.49 | −3.41 | −2.41 | −1.88 |
| DTUL | 315° C. | — | 267° C. | 318° C. |
| Blister Free Temp | 290° C. | — | 250° C. | 290° C. |

Visual assessment of the molded parts shows that Samples 1 and 2 exhibited a much darker black color compared to the comparative samples.
Measured L* values confirmed these visual findings.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A shaped part comprising a liquid crystalline polymer composition, the liquid crystalline polymer composition comprises a thermotropic liquid crystalline polymer and a black pigment that includes a plurality of carbon black particles in an amount of from about 1.5 wt. % to about 6 wt. % of the polymer composition, wherein the carbon black particles have an average size ranging from about 10 to about 100 nanometers and contain polynuclear aromatic hydrocarbons in an amount of about 1 part per million or less, wherein the composition defines a black surface of the part that is characterized according to the CIELAB test by a L* value of from 0 to 28, wherein L*=is a luminosity value ranging from 0 to 100, where 0=black and 100=white.

2. The shaped part of claim 1, wherein liquid crystalline polymers constitute from about 25 wt. % to about 75 wt. % of the polymer composition.

3. The shaped part of claim 1, wherein the black surface is also characterized according to the CIELAB test by a b* value of about 4 or less, wherein b* is the yellow/blue axis and ranges from −100 to 100, where positive values are yellowish and negative values are bluish.

4. The shaped part of claim 1, wherein the liquid crystalline polymer contains repeating units derived from an aromatic dicarboxylic acid, aromatic hydroxycarboxylic acid, aromatic diol, aromatic amide, aromatic amine, or a combination thereof.

5. The shaped part of claim 4, wherein the polymer further comprises one or more repeating units derived from an aromatic dial, aromatic amide, aromatic amine, or a combination thereof.

6. The shaped part of claim 1, wherein the liquid crystalline polymer is wholly aromatic.

7. The shaped part of claim 1, wherein the total amount of repeating units in the liquid crystalline polymer derived from naphthenic hydroxycarboxylic acids and/or naphthenic dicarboxylic acids is more than 15 mol. %.

8. The shaped part of claim 7, wherein the liquid crystalline polymer further contains monomer units derived from 4-hydroxybenzoic acid, terephthalic acid, isophthalic acid, 4,4'-biphenol, hydroquinone, acetaminophen, or a combination thereof.

9. The shaped part of claim 1, wherein the black pigment further contains a carrier resin.

10. The shaped part of claim 1, wherein the polymer composition comprises an inorganic particulate filler in an amount from about 5 wt % to about 60 wt. % of the composition.

11. The shaped part of claim 10, wherein the inorganic particulate filler includes talc.

12. The shaped part of claim 1, wherein the polymer composition comprises a fibrous filler in an amount from about 1 wt. % to about 40 wt. % of the composition.

13. The shaped part of claim 12, wherein the fibrous filler includes glass fibers.

14. The shaped part of claim 1, wherein the shaped part has a blister free temperature of about 270° C. or greater.

15. The shaped part of claim 1, wherein the deflection temperature under load is from about 250° C. to about 350° C., as determined in accordance ISO Test No. 75-2 at a load of 1.8 Megapascals.

16. The shaped part of claim 1, wherein the part is injection or compression molded.

17. A foodstuff article comprising the shaped part of claim 1.

18. The foodstuff article of claim 17, wherein the article is cookware or bakeware.

19. The shaped part of claim 1, wherein the black pigment contains benzo[a]pyrene in an amount of about 10 parts per billion or less.

* * * * *